United States Patent [19]

Mc Kee et al.

[11] Patent Number: 6,020,106
[45] Date of Patent: *Feb. 1, 2000

[54] USE OF MIXTURES OF POLYMETHYL METHACRYLATE AND STYRENE-ACRYLONITRILE COPOLYMERS FOR THE PRODUCTION OF LASER-INSCRIBED MOLDINGS

[75] Inventors: Graham Edmund Mc Kee, Neustadt; Martin Welz, Bad Dürkheim; Andreas Deckers, Flomborn; Daniel Wagner, Bad Dürkheim; Paul Otto Damm, Frankenthal; Hans-Josef Oslowski, Muenster, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,211

[22] PCT Filed: Jun. 3, 1995

[86] PCT No.: PCT/EP95/02110

§ 371 Date: Dec. 4, 1996

§ 102(e) Date: Dec. 4, 1996

[87] PCT Pub. No.: WO95/33793

PCT Pub. Date: Dec. 14, 1995

[30] Foreign Application Priority Data

Jun. 7, 1994 [DE] Germany ............................ 44 19 847

[51] Int. Cl.⁷ ..................................................... B41M 5/26
[52] U.S. Cl. ........................ 430/292; 430/297; 430/322; 430/945; 524/521; 524/523; 428/522
[58] Field of Search ..................................... 524/521, 523; 428/522; 430/945, 292, 297, 322; 106/472

[56] References Cited

U.S. PATENT DOCUMENTS

| | | | |
|---|---|---|---|
| 4,391,764 | 7/1983 | Edinger et al. | 264/25 |
| 4,393,164 | 7/1983 | McKee et al. | 525/83 |
| 4,551,294 | 11/1985 | Wottka et al. | 264/175 |
| 4,722,595 | 2/1988 | Siol | 252/589 |
| 4,959,406 | 9/1990 | Foltin et al. | 524/413 |
| 4,992,347 | 2/1991 | Hawkins et al. | 420/10 |
| 5,373,039 | 12/1994 | Sakai et al. | 524/100 |
| 5,576,377 | 11/1996 | El Sayed | 524/495 |

FOREIGN PATENT DOCUMENTS

| | | |
|---|---|---|
| 062223 | 10/1982 | European Pat. Off. . |
| 327 508 | 8/1989 | European Pat. Off. . |
| 330869 | 9/1989 | European Pat. Off. . |

OTHER PUBLICATIONS

Polymer 28 (1987), pp. 1177–1183.
Kunststoffe 81 (1991), Heft 4, pp. 341–346.
WPIDS database, abstract of EP 190997, Breitenfel et al., Aug. 13, 1986.

*Primary Examiner*—Terrel Morris
*Assistant Examiner*—Cheryl Juska
*Attorney, Agent, or Firm*—Keil & Weinkauf

[57] ABSTRACT

Transparent molded articles having a high-contrast laser inscription thereon are produced from a polymer mixture consisting of A) from 40 to 99% by weight of a polymer of an alkyl ester of (meth)acrylic acid, B) from 1 to 50% by weight of a copolymer of styrene and acrylonitrile having an acrylonitrile content of from 8 to 30% by weight, C) from 0 to 50% by weight of rubber particles, and D) from 0 to 20% by weight of additives and processing auxiliaries, by preparing a transparent molded article from the polymer mixture, and exposing the transparent molded article to laser radiation.

18 Claims, No Drawings

USE OF MIXTURES OF POLYMETHYL METHACRYLATE AND STYRENE-ACRYLONITRILE COPOLYMERS FOR THE PRODUCTION OF LASER-INSCRIBED MOLDINGS

BACKGROUND OF THE INVENTION

1. Field of the Invention

The present invention relates to the use of polymer mixtures containing, as essential components,

| | |
|---|---|
| A) from 40 to 99% by weight | of a polymer of an alkyl ester of (meth)acrylic acid, |
| B) from 1 to 50% by weight | of a copolymer of styrene and acrylonitrile having an acrylonitrile content of from 8 to 30% by weight, |
| C) from 0 to 50% by weight | of a rubber, and |
| D) from 0 to 20% by weight | of additives and processing auxiliaries, | for the production of moldings provided with an inscription with the aid of high-energy radiation.

2. Description of the Related Art

The production of laser-inscribed moldings from polymethyl methacrylate (PMMA) has hitherto been impossible in satisfactory quality without the addition of additives to increase the absorption coefficients of the laser radiation employed.

In particular for inscription with the Nd:YAG laser which is the most frequently used, pigments are added, but these adversely affect the transparency of the PMMA, which is frequently a prerequisite for the use of PMMA in the application. In the area of measuring beakers, scales and measuring rules, this is unacceptable; on the other hand, a durable inscription which is highly legible both in transmitted light and in incident light is desirable in these very applications.

The addition of carbon black to improve the laser inscribability of molding compositions comprising thermoplastics is described in DE-C 30 44 722, but this does not give satisfactory results in the case of PMMA.

Mixtures of PMMA and styrene-acrylonitrile copolymers (PSAN) are known and described, for example, in Polymer 28 (1987), 1177; at an acrylonitrile content of the PSAN in the range from 18 to 23% by weight, the transparency of moldings produced from the molding compositions is retained extremely well.

SUMMARY OF THE INVENTION

It is an object of the present invention to modify PMMA in such a way that very high-contrast inscription with sharp edges is possible using Nd:YAG lasers without there necessarily being any adverse effect on the transparency of the inscribed moldings.

We have found that this object is achieved by the novel use of the molding compositions described at the outset.

Preferred embodiments of the novel use are given in the subclaims.

DESCRIPTION OF THE REFERRED EMBODIMENT

The polymers A) of alkyl esters of (meth)acrylic acid are preferably those comprising

| | |
|---|---|
| from 50 to 100% by weight of | a $C_1$—$C_{18}$-alkyl ester of (meth)acrylic acid, and |
| from 0 to 50% by weight of | further free-radical-polymerizable monomers. |

In general, the acrylic acid esters employed are the $C_1$–$C_{18}$-alkyl esters, such as methyl, ethyl, n-propyl, i-propyl, n-butyl, i-butyl, sec-butyl, tert-butyl, pentyl, hexyl, heptyl, octyl, 2-ethylhexyl, nonyl, decyl, lauryl or stearyl acrylate, preferably methyl acrylate, n-butyl acrylate or 2-ethylhexyl acrylate, or mixtures of these monomers.

In general, the methacrylic acid esters employed are the $C_1$–$C_{18}$-alkyl esters, such as methyl, ethyl, n-propyl, i-propyl, n-butyl, i-butyl, sec-butyl, tert-butyl, pentyl, hexyl, heptyl, octyl, 2-ethylhexyl, nonyl, decyl, lauryl or stearyl meth acrylate, preferably methyl methacrylate, or mixtures of these monomers.

The use of hydroxyl-, epoxy- and amino-functional methacrylates and acrylates is also possible.

The acrylates and methacrylates and mixtures thereof are generally employed in amounts in the range from 50 to 100% by weight, preferably from 80 to 100% by weight, based on the total amount of monomers of component A).

As further comonomers, up to 50% by weight, preferably up to 20% by weight, of the following monomers, which are listed by way of example, can be employed:

vinylaromatic compounds, such as styrene, alpha-methyostyrene, vinyltoluene or p-(tert-butyl) styrene;

acrylic and methacrylic acid;

acrylamide and methacrylamide;

maleic acid and the imides and $C_1$–$C_{10}$-alkyl esters thereof;

fumaric acid and the imides and $C_1$–$C_{10}$-alkyl esters thereof;

itaconic acid and the imides and $C_1$–$C_{10}$-alkyl esters thereof;

acrylonitrile and methacrylonitrile.

The monomers are expediently selected so that the polymer formed has a glass transition temperature of at least 30° C. in order to avoid the polymer beads formed from sticking.

Observations hitherto suggest that particularly advantageous polymers are those comprising from 80 to 100% by weight of methyl methacrylate and from 0 to 20% by weight of methyl acrylate and/or n-butyl acrylate and having a molecular weight $M_n$ (number average) in the range from 20,000 to 300,000 g/mol.

Corresponding products and also processes for their production are known per se and are described in the literature. An example of a commercial product is Lucryl® methacrylate copolymer from BASF Aktiengesellschaft.

Component B) in the molding compositions used in accordance with the invention comprises from 1 to 50% by weight, preferably from 3 to 40% by weight, in particular from 5 to 35% by weight, of a copolymer of styrene and acrylonitrile having an acrylonitrile content of from 8 to 30% by weight, preferably from 15 to 25% by weight, in particular from 18 to 23% by weight.

The viscosity number of such polymers is generally in the range from 40 to 100 ml/g, preferably from 50 to 90 ml/g (measured in 0.5% strength by weight solution in dimethylformamide at 25° C.).

The molding compositions used in accordance with the invention can contain a rubber as further component C. If the transparency of the products is an important criterion, it should be ensured that the difference in refractive index between the matrix comprising A) + B) and the rubber is not greater than 0.007, preferably not greater than 0.005, in particular not greater than 0.002.

The size of the rubber particles in the matrix is generally in the range from 0.05 to 2 μm, preferably from 0.05 to 0.5 μm, particularly preferably less than 0.25 μm.

The rubber should furthermore preferably have a glass transition temperature of below 0° C., preferably below −10° C.

In principle, all types of commercially available rubbers, including those having an inhomogeneous (core/shell) structure, are suitable.

The morphology of the rubbers can very generally be modified to a considerable extent by varying the type of monomers and the sequence of their addition.

The following are mentioned here merely by way of example as monomers for the preparation of rubber: butadiene, isoprene, n-butyl acrylate and 2-ethylhexyl acrylate. These monomers can be polymerized with further monomers, for example styrene, acrylonitrile and further acrylates or methacrylates or vinyl alkyl ethers.

Preferred rubbers which may be mentioned here are graft copolymers of alkyl acrylates, butadiene and vinyl alkyl ethers, or mixtures thereof, as the graft base, and graft shells of styrene or substituted styrenes and acrylonitrile and/or methacrylonitrile and, if desired, (meth)acrylates.

Such products are described, for example, in U.S. Pat. No. 1,260,135, DE-A 32 27 555, DE-A 28 26 935, DE-A 31 49 357, DE-A 31 49 358 and DE-A 34 14 118.

In some cases, it has proven advantageous to add small amounts, in general not more than 200 ppm, preferably from 1 to 50 ppm, in particular from 2 to 20 ppm, of carbon black, graphite or animal charcoal to the molding compositions used in accordance with the invention, since this can in some cases improve the legibility of the laser inscription.

In addition to the components described above, the molding compositions can also contain other conventional additives and processing auxiliaries.

Mention is made here, merely by way of example, of plasticizers, lubricants, antioxidants, adhesion promoters, light stabilizers and pigments. The proportion of such additives is generally in the range from 0 to 20% by weight, and preferably from 0.001 to 5% by weight.

Corresponding compounds are known to the person skilled in the art and are described, for example, in EP-A 327 384.

The molding compositions described above are used in accordance with the invention for the production of moldings provided with an inscription with the aid of high-energy radiation.

The production of the moldings to be inscribed is not a subject-matter of the invention; corresponding processes are known to the person skilled in the art from the literature. A preferred process which is mentioned here merely by way of example is mixing of the components in the melt in an extruder, and subsequently processing the resultant granules by injection molding.

High-energy radiation which can be used in the novel use is, for example, electron or laser radiation, preference being given to laser radiation. Particular preference is given to Nd:YAG solid-state lasers. The moldings to be inscribed can be exposed to the radiation, for example, via an appropriate mask which corresponds to the desired inscription, although the electron or laser beam can also be controlled by means of a computer.

The intensity and duration of the exposure affect the contrast, penetration depth and surface structure of the molding. Details in this respect are given, for example, in two relevant publications in Kunststoffe 81 (1991), Issue 4, pages 341ff., and in Kunststoffe 78 (1988), Issue 8, pages 688ff., which concern the laser inscription of moldings made from thermoplastics. Mention may furthermore be made of DE-A 39 36 926, DE 36 19 670, DE 30 44 722 and EP-A 190 997.

The inscribed moldings obtainable by the novel use are distinguished by good contrast between the inscription and the background and simultaneously a good surface structure.

Particularly good results are achieved if moldings produced from the compositions described herein are provided with an at least two-coat finish, preferably with a first pale coat and a further darker coat which is applied on top of the first and has sufficient color contrast to the first coat to ensure good legibility. The color difference ΔE (in accordance with DIN 6174) between the colors of the finish coats is advantageously at least 5, preferably at least 7, particularly preferably at least 10.

Particular preference is given to the combination of black as a first finish coat and white as a second finish coat.

If moldings produced in this way are then inscribed with a laser in a manner known per se, the dark finish coat is evaporated or burnt off, giving a very high-contrast inscription (pale marking on a dark background), which is highly legible, in particular, under background illumination with a visible-light source. Moldings of this type are therefore particularly suitable for the production of displays or display scales, for example for consumer electronic products, such as radio sets.

Particularly good results are achieved for such uses if the molding composition from which the corresponding moldings are produced comprises polymer mixtures as described in EP 62 223, ie. mixtures of styrene-acrylonitrile copolymers, methyl methacrylate polymers and graft polymers based on styrene-acrylonitrile copolymers which have been impact-modified by means of acrylate rubber and/or butadiene rubber.

EXAMPLES

In the examples below, the inscriptions were carried out using an Nd:YAG laser which emits in the IR region at a wavelength of 1,064 μm.

The laser beam was, as described in EP-A 330 869 which corresponds to U.S. Pat. No. 4,959,406, guided over the surface which was at the point of focus, in accordance with the shape to be written by two computer-controlled rotatable mirrors. The inscription was optimized for the mixtures used by adjusting the lamp current, diaphragm, pulse frequency and speed of the laser beam.

The contrast, which is also given in the Table, was deterined by measuring the ratio between the background and marking luminance under a uniform illuminance of 500 cd/m$^2$.

The light transmission X was measured in accordance with DIN 5036 on circular disks with a thickness of 2 mm.

The following components were used:

A: Copolymer comprising 99% by weight of methyl methacrylate and 1% by weight of methyl acrylate and having a molecular weight ($M_n$) of 110 000 g/mol (Lucryl® methacrylate copolymer G88 from BASF Aktiengesellschaft)

B: Copolymer comprising 81% by weight of styrene and 19% by weight of acrylonitrile and having a viscosity number of 70 ml/g (measured in 0.5% strength by weight solution in dimethylformamide at 25° C.).

All mixtures also contained 10 ppm of carbon black (Printex® carbon block 90 from Degussa).

The mixtures were mixed, homogenized and extruded in a twin-screw extruder from Werner & Pfleiderer. The quality was determined on tiles with a thickness of 2 mm produced by injection molding.

The results are shown in the Table.

TABLE

| Ex. | Composition | | Contrast | | visual assessment of the inscription quality | | Transmission τ in % |
|---|---|---|---|---|---|---|---|
| | A (% by wt.) | B (% by wt.) | pale inscription | dark inscription | pale inscription | dark inscription | |
| 1 C *) | 100 | — | 1.1 | 12.9 | unsatisfactory | poor | 91 |
| 2 | 95 | 5 | 1.2 | 12.6 | satisfactory | moderate | 91 |
| 3 | 90 | 10 | 1.2 | 12.4 | satisfactory | satisfactory | 91 |
| 4 | 85 | 15 | 1.3 | 10.5 | good | satisfactory | 91 |

*) Comparative Example

We claim:

1. A process for producing a molded article having a high-contrast laser inscription thereon, which process comprises: providing a polymer mixture consisting essentially of:

A) from 40 to 99% by weight of a polymer of an alkyl ester of (meth)acrylic acid, B) from 1 to 50% by weight of a copolymer of styrene and acrylonitrile having an acrylonitrile content of from 18 to 23% by weight, C) from 0 to 50% by weight of rubber particles having a particle size of from 0.05 to 2 μm and a glass transition temperature of less than 0° C., D) from 0 to 20% by weight of additives and processing auxiliaries selected from the group consisting of plasticizers, lubricants, antioxidants, adhesion promoters, and light stabilizers, and E) from 0 to 200 ppm of a member selected from the group consisting of carbon black, graphite, and animal charcoal;

preparing a transparent molded article from the polymer mixture; and exposing the transparent molded article to laser radiation to produce a transparent molded article having high-contrast inscription thereon.

2. The process of claim 1, where the refractive index of component C) differs from the refractive index of the mixture of A) and B) by a maximum of 0.005 units.

3. The process of claim 1, where component A) comprises
   from 80 to 100% by weight of methyl methacrylate, and
   from 0 to 20% by weight of methyl acrylate or n-butyl acrylate, or a mixture thereof,
   and has a number average molecular weight $M_n$ of from 20,000 to 300,000 g/mol.

4. The process of claim 1, wherein component E) is present in an amount of from 1 to 50 ppm.

5. The process of claim 1, wherein the polymer mixture consists essentially of styrene-acrylonitrile copolymer, methyl methacrylate polymer and graft polymers based on styrene-acrylonitrile copolymers which have been impact-modified by means of acrylate or butadiene rubbers.

6. The process of claim 1, wherein component D) is present in an amount of from 0.001 to 5% by weight.

7. The process of claim 1, wherein component E) is present in an amount of from 2 to 20 ppm.

8. The process of claim 1, wherein component B) is present in an amount of from 3 to 40% by weight.

9. The process of claim 7, wherein the rubber particles have a particle size of from 0.05 to 0.5 μm.

10. The process of claim 1, wherein the rubber of the rubber particles has a glass transition temperature of less than −10° C.

11. The process of claim 5, wherein component A) comprises
    from 80 to 100% by weight of methyl methacrylate, and
    from 0 to 20% by weight of methyl acrylate or n-butyl acrylate, or a mixture thereof,
    and has a number average molecular weight $M_n$ of from 20,000 to 300,000 g/mol.

12. The process of claim 5, wherein component B) is present in an amount of from 3 to 40% by weight.

13. The process of claim 5, where the refractive index of component C) differs from the refractive index of the mixture of A) and B) by a maximum of 0.005 units.

14. The process of claim 5, wherein the rubber particles have a particle size of from 0.05 to 0.5 μm.

15. The process of claim 5, wherein the rubber of the rubber particles has a glass transition temperature of less than −10° C.

16. The process of claim 5, wherein component D) is present in an amount of from 0.001 to 5% by weight.

17. The process of claim 5, wherein component E) is present in an amount of from 1 to 50 ppm.

18. The process of claim 5, wherein component E) is present in an amount of from 2 to 20 ppm.

* * * * *